April 17, 1934.  R. R. SEARLES  1,955,097
SPRING CONNECTION
Filed Dec. 4, 1930
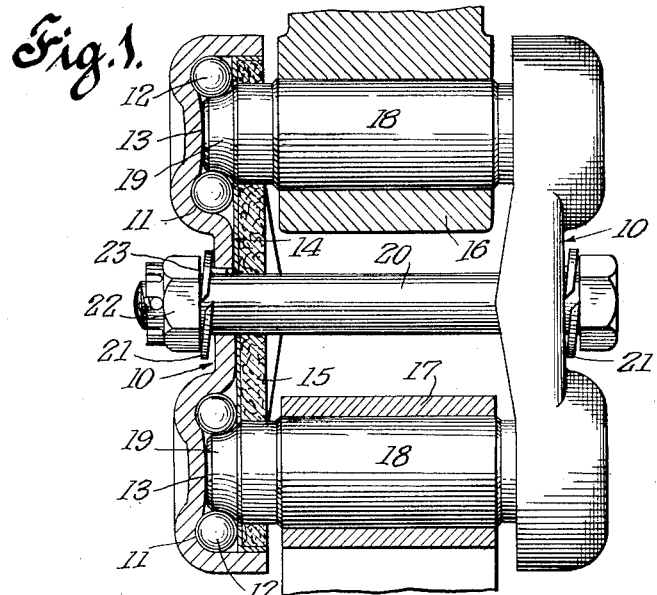
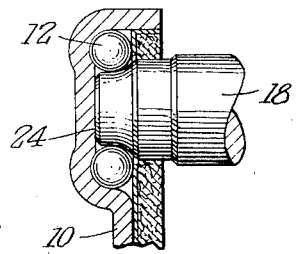
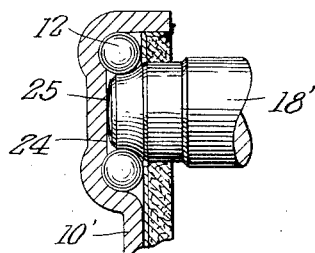
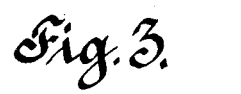
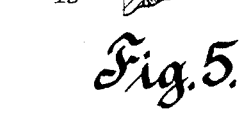
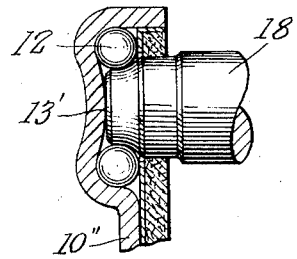
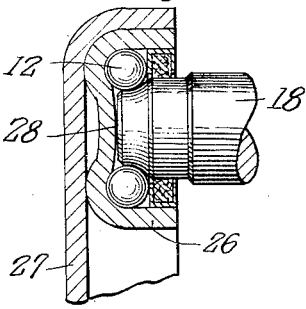
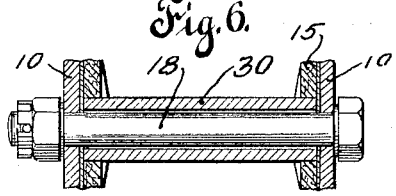
INVENTOR
Raymond R. Searles
BY
Mitchell Bechert
ATTORNEYS.

Patented Apr. 17, 1934

1,955,097

UNITED STATES PATENT OFFICE 1,955,097

SPRING CONNECTION

Raymond R. Searles, New Britain, Conn., assignor to The Fafnir Bearing Company, New Britain, Conn., a corporation of Connecticut Application December 4, 1930, Serial No. 499,928

6 Claims. (Cl. 267—54)

My invention relates to a spring connection, and more particularly to a shackle construction.

It is the general object of the invention to provide an improved spring connection, which will be of very few parts, simple in construction, efficient in operation, and cheap to manufacture.

It is another object to provide an anti-friction spring shackle construction in which bearing means carried by parts, such as a spring and frame, act as the spacing means for the shackle links.

Other objects will become apparent or will be pointed out hereinafter.

Briefly stated, in a preferred form of the invention I employ shackle links having spaced apart raceways for movable anti-friction bearing members. Bearing means, such as pins, to be carried by connected parts, such as the frame and spring, are interposed between opposed raceways of each shackle link. The bearing means serve to space the shackle links apart, thus taking end thrusts between the shackle links and pins. Antifriction bearing members, such as balls, are interposed between the raceways on the shackle links and the pin means. The shackle links are connected together preferably by a through-bolt, which may embody resilient means, so that the links will be resiliently held in engagement with the pins. The shackle links themselves may be of slightly springy material, so as to provide such resilient connections. The contacting parts of the pin means and shackle links, if desired, may be relatively rounded, so as to reduce the area of contact.

In the drawing which shows, for illustrative purposes only, preferred forms of the invention—

Fig. 1 is a view in elevation of an assembled shackle, one shackle link being shown in central section;

Figs. 2, 3, 4, 5 and 6 are fragmentary sectional views of modifications.

Since the shackle is symmetrical, a description of one link and associated parts will suffice.

Each link 10 may be formed of sheet metal, preferably of generally channel-shape form, so as to provide a sturdy link which is cheap to manufacture. In the form illustrated in Fig. 1 each link has spaced-apart raceways 11—11 for movable anti-friction bearing members, such as balls 12, and these raceways are preferably at the ends of the link. The central part on each raceway portion is bowed up, as indicated at 13. This bowing up of the central part of the raceway provides a substantial rounded raceway surface or track for the balls 12—12 and creates a shoulder to prevent inward radial displacement thereof. The balls may be held in a suitable retainer, but I prefer to substantially fill each raceway with balls of the required size and hold the balls in place against axial displacement by means of suitable dust-excluding and lubricant-retaining means, which may be in the form of a sheet metal plate 14, forced into the channel-shaped link. A felt plate or washer 15 may form a part of a dust-excluding and lubricant-retaining means. Thus, each link with its assembled balls may be handled and shipped as a unit.

The parts to be connected, such as the frame 16 and load carrying spring 17 of a motor vehicle, carry bearing means preferably in the form of pins 18—18. Such pins may be driven into suitable eyes or otherwise securely held in place therein, so as to hold the connected parts out of engagement with the shackle links.

Each pin is provided with bearing means, which may be in the form of a track or raceway 19, formed directly on the side of the pin end. Such raceways 19 in the present embodiment are shaped so as to take principally radial loads. When the shackle is assembled, the fit of the parts is preferably such that there is slight clearance between the balls and the complementary raceways 11 and 19. The greater the allowable clearance the less accuracy will be required in manufacturing for interchangeable assembly.

The links are adapted to directly abut the ends of the pins 18—18 or other bearing means and be thereby spaced apart. With the central part of the bearing portion of each link bowed or curved as illustrated the area of contact with the adjacent pin end is quite small. The links are connected by suitable means, such as a bolt 20. It is desirable to hold the links in resilient engagement with the pin ends, and to that end I have illustrated spring washers 21—21 interposed between the links and the head and nut on the through bolt. It may be desirable to notch the links or head and nut to prevent the spring washers from turning. If desired, the links or at least portions thereof may be made slightly resilient, so that the spring washers 21—21 may be omitted and the spring of the links relied upon for securing the resilient fit. Such resilient fit is highly desirable, for the reason that with such a fit a mechanic, in tightening up the nut 22, cannot so cramp the parts that they cannot act efficiently. If desired, the nut 22 may abut a shoulder 23 on the through bolt 20, so that when the bolt is screwed up to its maximum extent the spring of the spring washers 21 is effective for holding the links together with the desired force. Thus, in my present construction, no spacing means other than the pins 18—18 is required.

The assembled shackle being preferably resiliently held together may be slightly distorted when subjected to side sway of a vehicle. Such slight distortion is not objectionable, and is even advantageous in absorbing shocks and also in causing the slight teetering of the pin ends on their bearing surfaces 13 of the links, so as to facilitate lubrication. It will be understood that the space about the balls is filled with lubricant before assembly. Due to the effective lubrication of the sliding contacting surfaces between pins 18 and the shackle links, and also due to the relatively slight rotative sliding movement, squeaks do not develop so long as there is lubricant in the space about the bearings. It will be seen that the present shackle is simpler in construction than those heretofore in use, and this without the sacrifice of the many advantages of a shackle of this type.

In the form shown in Fig. 2 the pin 18 is of the same type as that disclosed in Fig. 1; that is, the end 23 of the pin is flat and instead of abutting a round surface, as in Fig. 1, such flat end 23 abuts a flat surface 24 centrally of the bearing portion of the link 10'. Even though the surfaces 23—24 be flat, they will be adequately lubricated, due to the slight teetering heretofore referred to which permits the lubricant to work in.

In the form shown in Fig. 3 the pin 18 is the same as that heretofore described, but the shackle link 10' is provided with a raceway having the central portion smoothly curved, so as to produce the raised bearing portion 13', functioning in the manner described in connection with Fig. 1.

In the form shown in Fig. 4 the link 10' is the same as that disclosed in Fig. 2; that is, the bottom of the bearing portion of the link is flat, as indicated at 24. The pin 18', however, is rounded, as indicated at 25, so as to reduce the bearing surfaces in contact with each other.

In the form shown in Fig. 5 the pin 18 is the same as that disclosed in Figs. 1, 2 and 3. The shackle link in this case, however, is not provided with the outer bearing directly thereon, but such bearing is provided in a separate raceway cup 26, fitting in the channel-shaped link 27. The cup 26 having the bearing raceways for the balls 12—12 is centrally bowed, as indicated at 28, to engage the end of the pin 18.

In Fig. 6 the shackle links are limited in their approach to each other by a spacer 30 interposed between the links and preferably surrounding the tie bolt. The length of the sleeve 30 is such that a mechanic cannot unduly distort the links or overcramp the links and pins 18 by screwing up on the nut. The same result is accomplished by the shoulder 23 on the bolt 20, shown in Fig. 1. If the spacer 30 is short, the links may spring, but in any event the sleeve when used should be long enough so that when the links contact with the spacer the pressure between the pins 18 and links will not be unduly high.

All forms of the invention operate in substantially the same manner.

While I have described certain practical embodiments, it is to be understood that other embodiments may be made and other combinations of those disclosed may be made, all within the scope of the invention as defined in the appended claims.

I claim:

1. In a spring shackle construction, a pin to be secured to a spring and project beyond the sides thereof, a pin to be secured to a frame and project beyond the sides thereof, a pair of shackle links each having a pair of spaced apart raceway cups, said cups being positioned about the projecting ends of said pins on said spring and frame and being in direct abutting relation thereto to space said links apart and to take axial end thrusts between said links and pins, a through bolt for drawing said links together, and anti-friction bearing members interposed between the sides of said projecting pin ends and said raceway cups and sustaining radial loads between said pins and shackle links.

2. In the combination defined in claim 1, and spacing means interposed between said links for limiting the approach of said links toward each other.

3. In a spring shackle construction, outwardly directed bearing means on a frame, outwardly directed bearing means on a spring, each of said bearing means having a raceway thereon at each side of said frame and spring, a pair of shackle links each having a pair of spaced apart raceways formed directly thereon and complementary to the raceways on said bearing means, the ends of said bearing means being in direct abutting relation to said shackle links to take axial thrust loads between said links and bearing means, means for securing said links to each other, and anti-friction bearing members interposed between the raceways formed in said shackle links and said bearing means on said spring and frame to take radial loads between said shackle links and bearing means.

4. In a spring shackle construction, outwardly directed bearing means on a frame, outwardly directed bearing means on a spring, each of said bearing means having a raceway thereon at each side of said frame and spring, a pair of shackle links each having raceway holding means at spaced apart points thereon, separate raceway cups held on said holding means, the bottoms of said cups being in direct abutting relation to the ends of said bearing means to take axial thrust loads between said shackle links and said bearing means, means for securing said links to each other, and anti-friction bearing members interposed between said separate bearing cups and said bearing means to take radial loads between said links and bearing means.

5. In a spring shackle construction, outwardly directed bearing means on a frame, outwardly directed bearing means on a spring, each of said bearing means having a raceway at each side of said spring and frame, a pair of shackle links each having a pair of raceway means at spaced apart points thereon, said raceway means being positioned complementary to the raceways on said bearing means on said frame and spring and being in abutting relation thereto to take axial end thrusts between said bearing means and links, means for securing said links to each other, and anti-friction bearing members interposed between said bearing means and said raceway means to sustain radial loads between said shackle links and said bearing means.

6. In a spring connection, means having a pair of outwardly directed bearing raceways, a pair of side members in direct abutting relation with said means to take axial end thrusts between said side members and said means, said side members having raceways complementary to said first mentioned raceways, anti-friction bearing members interposed between said complementary raceways to take radial loads between said side members and said means, means for securing said side members in position to take axial end thrusts as aforesaid.

RAYMOND R. SEARLES.